Patented July 27, 1948

2,445,948

UNITED STATES PATENT OFFICE 2,445,948

HYDROXYPHOSPHATIDES

Harold Wittcoff, Minneapolis, Minn., assignor to General Mills, Inc., a corporation of Delaware No Drawing. Application December 4, 1944, Serial No. 566,651

6 Claims. (Cl. 260—403)

The present invention relates to modified phosphatidic compounds and to a method of producing the same. More particularly it relates to hydroxylated phosphatides and esters thereof, and to a method of producing the same.

The present commercially produced vegetable phosphatides contain from 50–70% of a mixture of materials which are commonly referred to collectively as lecithin and which, in addition to the compound, lecithin, may contain cephalin, other phosphatides, carbohydrates, etc. The remainder of the composition is usually an oleaginous carrier, such as soya bean oil or cocoa butter. Such products are usually dark colored, sticky, viscous, and difficult to handle. Moreover, the ordinary commercial product disperses in water and forms emulsions only with great difficulty despite the emulsifying properties of the phosphatides. It is oft-times necessary to add an auxiliary substance, such as benzyl alcohol in order to obtain said emulsions. While the difficulty of dispersing the lecithin in water may not interfere with the satisfactory use of the material in some instances, as, for example, its use in chocolate, other uses, such as the uses to which phosphatides are put in the baking or textile industry, require that the product be readily dispersible in water and other aqueous media.

The oleaginous material employed as a carrier in present day commercial vegetable phosphatide compositions has as one of its most important functions the stabilizing of the phosphatide, which ordinarily is considered to be quite unstable when exposed to the atmosphere. According to the present invention, this lack of stability of the isolated phosphatide is obviated, and accordingly the product may be prepared, stored and used without any oleaginous carrier. For this reason and others, the product of the present invention is readily dispersible in aqueous media without the aid of an auxiliary substance, such as the benzyl alcohol referred to above.

It is, therefore, a primary object of the present invention to provide a modified phosphatide which is stable even in the absence of oleaginous carrier.

It is another object of the present invention to provide a phosphatide product which disperses with ease in water and aqueous media.

A further object of the invention is to provide a method of preparing such products.

These and other objects of the invention will be apparent from the following detailed description of the invention. In general the invention comprises the hydroxylation of unsaturated higher fatty acid groups in phosphatides such that the degree of unsaturation of the product is reduced and its stability improved, and such that its dispersibility in water or aqueous media is improved in view of the increase in the hydrophilic groups in the phosphatide molecule. Similar results are obtainable where the hydroxyl groups so introduced are esterified or are partially esterified with low aliphatic acids.

The hydroxylation may be carried out by various methods as will readily be understood by those skilled in the art. Many reagents or combinations thereof which effect hydroxylation or acyloxylation are known. For example, the following may be used: potassium permanganate, hydrogen peroxide with acetic acid, hydrogen peroxide with osmium tetraoxide and tert-butyl alcohol, lead tetracetate, dibenzoyl silver iodide complex, osmium tetraoxide in a non-aqueous solvent, hydrogen peroxide and sulfuric acid or hydrogen peroxide alone. Any of these reagents may be used under the required conditions for hydroxylation, care being taken to employ conditions which are not deleterious to the phosphatide compound involved. Of these reagents, hydrogen peroxide, with or without a catalyst, has been found highly satisfactory.

The hydroxylation may be carried out on the phosphatide in almost any form. Thus, the reaction may be carried out in the presence or absence of the usual oleaginous carrier, and the resultant hydroxylated phosphatide may be isolated from the reaction mixture, or may be retained in the hydroxylated oleaginous carrier, or may be incorporated into a non-hydroxylated oleaginous carrier, all of which will be apparent from the examples herein.

When acetic acid and hydrogen peroxide are used as the hydroxylating agent, the phosphatide material is dissolved or partially dissolved in a requisite amount of glacial acetic acid. An auxiliary solvent, such as chloroform or benzene, may be added to effect complete homogeneity after which hydrogen peroxide of about 30% concentration is added. Thereafter the mixture is stirred and heated to a temperature of from 40–100° C. for a period of time sufficient to effect hydroxylation, which may extend up to 7 hours. After hydroxylation has been effected, the solvent may be removed in vacuo, following which the hydroxylated phosphatide is recovered by treatment of the reaction residue with acetone. If it is desirable that the hydroxylated phosphatide remain in the hydroxylated, oleaginous carrier, acetone extraction of the carrier is not employed, and the product is used after the in vacuo removal of the solvent. The extent of hydroxylation is measured by iodine number decrease which may be as great as 50 units. In the presence of acetic acid, a certain amount of esterification occurs which, however, does not affect the desirable properties of the product.

When sulfuric acid and hydrogen peroxide are used as the hydroxylating agent, it is preferred to dissolve the phosphatide or phosphatide containing material in a solvent such as benzene or dioxane. The hydrogen peroxide solution is then added together with a catalytic amount of concentrated sulfuric acid. If the organic solvent used is water-immiscible, an emulsion is formed upon stirring and heating. Thereafter the procedure is similar to that where acetic acid and hydrogen peroxide are used, with the exception that in the present case it is desirable to neutralize the sulfuric acid when the reaction is completed. This may be done by the addition of alcoholic caustic alkali, or other suitable alkali. This step also may be used as a means of controlling the acid number of the product. Thus, neutralization may be carried to the point at which the product has the desired acid number.

As a general rule, use of sulfuric acid and hydrogen peroxide does not effect hydroxylation as extensively as does acetic acid and hydrogen peroxide. This procedure is highly desirable, however, as it results in markedly increased yields and the product has a superior taste and odor as compared with the acetic acid catalyzed product.

Where hydrogen peroxide alone is used as the hydroxylating agent, the conditions are similar to those outlined for the use of sulfuric acid and hydrogen peroxide with the exception that a higher concentration of hydrogen peroxide is used, and, of course, the neutralization step is unnecessary. This procedure likewise does not produce as extensive hydroxylation as acetic acid and hydrogen peroxide.

If the phosphatide material is treated in the presence of an oleaginous carrier, the oleaginous carrier, which likewise has been hydroxylated during the process, is removed during the acetone washing. This oil may be recovered as a valuable by-product, if desired. The isolated phosphatide may be incorporated into an oil carrier if desired. This may be effected by simply triturating the oil with the product or by dissolving the oil and the phosphatide in a mutual solvent, such as chloroform, after which the solvent may be removed as by evaporation.

Example I

A solution of 100 grams of "commercial lecithin," composed of about 55% phosphatide and about 45% soya bean oil, in 100 cc. of chloroform was treated with 300 cc. of glacial acetic acid and 20 grams of 30% hydrogen perodixe solution. The resultant mixture was agitated and heated at 65° C. for 2 hours in a three-necked flask equipped with stirrer and thermometer. Thereafter the solution was evaporated in vacuo to yield a syrupy material which was then washed with acetone several times and finally triturated with acetone in a mortar. The mixture was then filtered, dried in vacuo to yield a dry powdered or granular material which could be processed to any desired particle size. The original lecithin (isolated from the soya bean oil carrier) had an iodine number of 95.6, whereas the isolated hydroxylated product had an iodine number of 47.5. The isolated hydroxylated lecithin was light in color and dispersed readily in water.

Example II

A solution of 20 grams of lecithin obtained by removing the oil from "commercial lecithin" by means of acetone was mixed with 150 cc. of glacial acetic acid and the resultant mixture treated with 5 grams of 30% hydrogen peroxide and allowed to stand overnight. Thereupon the solution was heated at 40–50° C. for 10 to 15 minutes. The hydroxylated lecithin was isolated from the reaction mixture in the manner indicated in Example I. The iodine number had decreased from 82.0 to 59.0.

Example III

A solution of 20 grams of "commercial lecithin" in 150 cc. of glacial acetic acid was treated with 7.5 cc. of 30% hydrogen peroxide whereupon the reaction mixture was heated at 55° C. with stirring for 3½ hours. The acetic acid and other volatile material was removed in vacuo to yield a light, creamy product consisting of hydroxylated phosphatide in a hydroxylated oleaginous carrier. The iodine number had been lowered to 61.3 from the initial value of 93.8.

Example IV

A solution of 20 grams of "commercial lecithin" in 30 cc. of dioxane was treated with 2 grams of 30% hydrogen peroxide and 0.5 cc. of concentrated sulfuric acid. The solution was stirred and heated for 1 hour at 50–55° C., after which the lecithin was isolated in a manner similar to that of Example I. The iodine number had decreased from 82.0 to 71.5.

Example V

A solution of 100 grams of "commercial lecithin" in 150 cc. of benzene was treated with 40 grams of 30% hydrogen peroxide and 1 cc. of concentrated sulfuric acid. An emulsion formed which was stirred and heated at 70° C. for 2 hours, after which an amount of alcoholic KOH equivalent to the amount of sulfuric acid used was added. Care should be exercised during the neutralization to prevent excessive foaming. Thereafter the hydroxylated lecithin was isolated according to the procedure of Example I to yield a product whose iodine number had been lowered from 95.6 to 73.4.

Example VI

A solution of 100 grams of "commercial lecithin" in 150 cc. of benzene was treated with 40 grams of 30% hydrogen peroxide and the resultant emulsion was stirred and heated at 60° C. for 2 hours. The lecithin was then isolated in the manner similar to that of Example I and possessed an iodine number of 78.6 as compared with an iodine number of 95.6 for the starting lecithin.

Considerable variation is permissible in the quantities and concentrations of solvents and reagents and also in time periods and temperatures as is well understood in the art relating to hydroxylation. It should be borne in mind, however, that lecithin and other phosphatides may be deleteriously affected by drastic reaction conditions. Accordingly, it is preferred that the reaction conditions, such as temperature and length of time of heating, be maintained as mild as is consistent with the degree of hydroxylation desired. For example, time periods for heating the reaction mixture may vary from 15 minutes to 7 hours or longer, a reaction time of 2 hours having been found quite suitable. Temperatures in the neighborhood of 60° C. are preferred, and usually it is not desirable to employ a temperature substantially in excess of that of a steam bath (about 100° C.). The hydrogen peroxide is preferably employed in about 30% concentration in view of the ready availability of this material in this form. Greater concentrations may be used but are not desirable in view of their unavailability. Lesser concentrations may also be used although they may extend the time required for reaction or may result in a lesser degree of hydroxylation. The extent of hydroxylation is preferably within that which effects an iodine number reduction of from 5 to 50 units. Variations outside of this range, however, may be made; although an iodine value decrease greater than 50 units is less desirable from the point of view of processing, whereas an iodine value decrease of less than 5 units yields a product whose desirable characteristics have been impaired.

While various embodiments of the invention have been described in detail, it is to be understood that the invention is not limited thereto but may be varied within the scope of the appended claims. The term lecithin as used in the appended claims is intended to include the pure compound lecithin as well as the mixture of phosphatides commercially known as lecithin.

I claim as my invention:

1. A process which comprises reacting a phosphatide containing an unsaturated higher fatty acid group with a hydroxylating agent comprising hydrogen peroxide and acetic acid under hydroxylating conditions to introduce an OX group at a point of unsaturation, X being selected from the group consisting of hydrogen and acetyl.

2. A process which comprises reacting a phosphatide containing an unsaturated higher fatty acid group with a hydroxylating agent comprising hydrogen peroxide and acetic acid under hydroxylating conditions in order to lower the iodine number of the phosphatide from about 5 to 50 units.

3. A process which comprises reacting a phosphatide containing an unsaturated higher fatty acid group with a hydroxylating agent comprising hydrogen peroxide in the presence of a catalytic amount of sulfuric acid under hydroxylating conditions to introduce an OH group at a point of unsaturation.

4. A process which comprises reacting a phosphatide containing an unsaturated higher fatty acid group with a hydroxylating agent comprising hydrogen peroxide in the presence of a catalytic amount of sulfuric acid under hydroxylating conditions to introduce an OH group at a point of unsaturation, and neutralizing the sulfuric acid to a desired extent to control the acid number of the phosphatide.

5. A phosphatide characterized by improved stability and improved water dispersibility, containing a higher fatty acid group, said fatty acid group having attached to a carbon atom thereof an OX group in which X is the acyl group of a low aliphatic acid.

6. A phosphatide characterized by improved stability and improved water dispersibility, containing higher fatty acid groups, said phosphatide having attached to a carbon atom of at least some of said higher fatty acid groups an OX group in which X is the acyl group of a low aliphatic acid, the phosphatide having sufficient OX groups so attached to give the resultant phosphatide an iodine number of from 5–50 units lower than that of the same phosphatide not possessing OX groups but which contains an equivalent number of unsaturated carbon to carbon bonds.

HAROLD WITTCOFF.

REFERENCES CITED

The following references are of record in the file of this patent:

UNITED STATES PATENTS

| Number | Name | Date |
|---|---|---|
| 1,892,588 | Schwieger | Dec. 27, 1932 |
| 1,893,393 | Bollmann | Jan. 3, 1933 |
| 2,339,164 | Greenfield | Jan. 11, 1944 |

FOREIGN PATENTS

| Number | Country | Date |
|---|---|---|
| 412,224 | Great Britain | June 19, 1934 |